United States Patent [19]

Jansma et al.

[11] Patent Number: 4,494,530

[45] Date of Patent: Jan. 22, 1985

[54] SEPARATION OF GLUTEN AND STARCH FROM WHEAT FLOUR

[75] Inventors: Wytze Jansma; Jan Mars, both of Nijmegen; Pieter G. Stoutjesdijk, Wychen; Herman J. Vegter, Santpoort, all of Netherlands

[73] Assignee: Latenstein Zetmeel B.V., Rotterdam, Netherlands

[21] Appl. No.: 475,507

[22] Filed: Mar. 15, 1983

[30] Foreign Application Priority Data

Mar. 25, 1982 [GB] United Kingdom ................. 8208768

[51] Int. Cl.$^3$ .............................................. C13L 1/00
[52] U.S. Cl. ....................................... 127/69; 127/24; 260/112 G
[58] Field of Search ........................ 127/24, 25, 39, 40, 127/65, 67–69, 71; 260/112 G

[56] References Cited

U.S. PATENT DOCUMENTS

| | | | |
|---|---|---|---|
| 2,488,747 | 11/1949 | Strezynski | 127/69 |
| 2,504,962 | 4/1950 | Burdick | 127/67 |
| 2,689,810 | 9/1954 | Vegter | 127/69 |
| 2,773,784 | 12/1956 | Williams | 127/68 |
| 3,901,725 | 8/1975 | Bond et al. | 127/67 |
| 3,951,938 | 4/1976 | Kerkkonen et al. | 127/67 |
| 4,132,566 | 1/1979 | Verberne et al. | 127/67 |
| 4,154,623 | 5/1979 | Schwengers et al. | 127/71 |
| 4,280,718 | 7/1981 | Johnson et al. | 127/71 |
| 4,283,232 | 8/1981 | Best | 127/71 |

FOREIGN PATENT DOCUMENTS

| | | |
|---|---|---|
| 2323248 | 12/1976 | Fed. Rep. of Germany . |
| 2341570 | 1/1980 | Fed. Rep. of Germany . |
| 580921 | 10/1976 | Switzerland . |
| 2032245 | 5/1980 | United Kingdom . |

OTHER PUBLICATIONS

Verberne et al., "A New Hydrocyclone Process for the Separation of Starch & Gluten from Wheat Flour," *Starch*, 1978, pp. 337–338.

Hostinova et al., "Alpha-Amylase from *Streptomyces aureofaciens* Purification & Properties," *Starch*, 1978, pp. 338–341.

Clendenning et al., "Separation of Starch & Gluten," *Canadian Journal of Research*, 1950, pp. 390–400.

*Food Science & Technology Abstracts*, vol. 17, No. 2, 1971, pp. 46–49.

*Primary Examiner*—Peter Hruskoci
*Attorney, Agent, or Firm*—Dennison, Meserole, Pollack & Scheiner

[57] ABSTRACT

In a process utilizing a battery of hydrocyclones for separating wheat starch and gluten contained in an aqueous wheat flour slurry, the slurry is supplied to a first section of the hydrocyclone battery, in which a gluten fraction is removed as overflow, and the starch-rich fraction from such first battery section is first treated to reduce its pentosan content and is then treated in a second section of the hydrocyclone battery which delivers a concentrated starch fraction as underflow.

3 Claims, 1 Drawing Figure

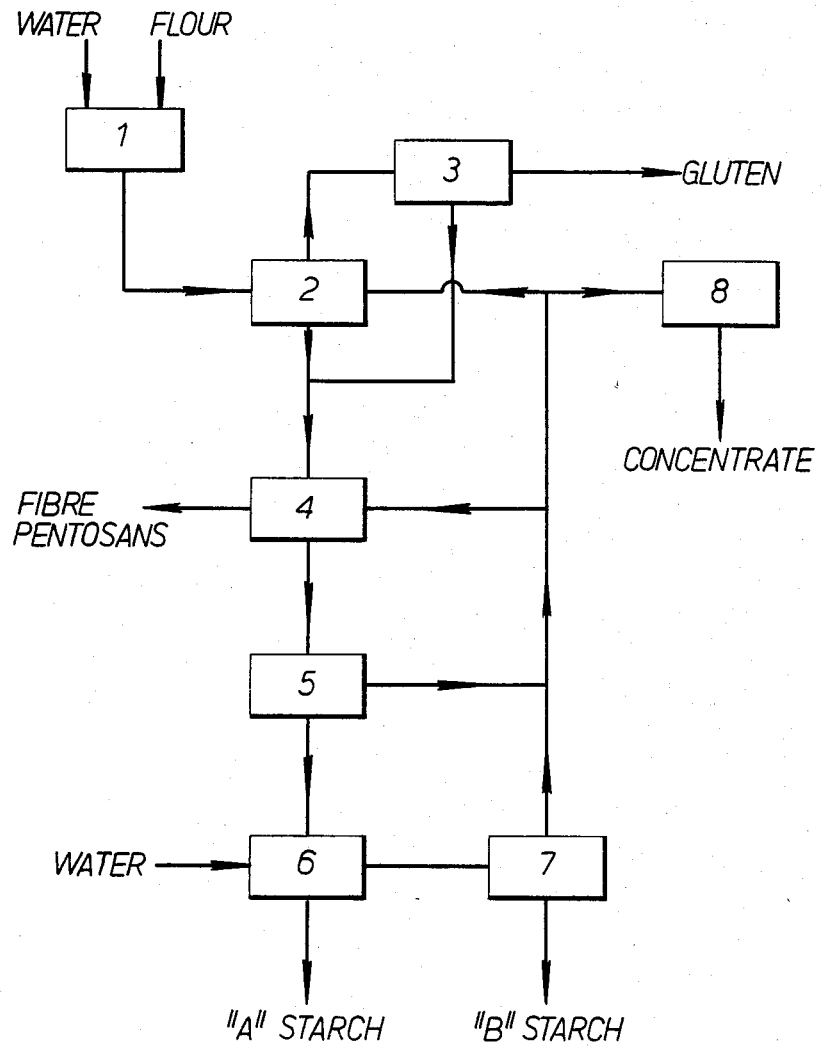

SEPARATION OF GLUTEN AND STARCH FROM WHEAT FLOUR

This invention relates to a process for separating wheat starch and gluten, contained in an aqueous wheat flour slurry, by means of hydrocyclones.

A hydrocyclone, as is well known, comprises a radially symmetrical chamber, herein called "vortex chamber", which tapers over the whole or the greater part of its length and has a feed passage opening into its wider end, and opposed axial discharge apertures. When liquid is fed continuously under pressure through the feed passage, the liquid forms in the chamber a vortex wherein the angular velocity increases from the inner surface of the chamber towards the vortex core and liquid continuously discharges from the chamber through its opposed axial discharge apertures. When solid particles are entrained in the liquid their movement in the vortex chamber is governed by centrifugal and centripetal forces and they may leave the hydrocyclone through the discharge aperture in its wider end, or through its apex discharge aperture, depending on the settling rate of the particles in a static body of the liquid. Hydrocyclones have been used very successfully for several decades as a tool for separating particles of different compositions into fractions of particles of different settling rates.

Hydrocyclones have been used extensively in the starch industry for several decades in the recovery of starch from maize. This use of hydrocyclone is described, e.g., in U.S. Pat. No. 2,689,810. The starch slurry is passed through a succession of hydrocyclone stages in counter current with wash water. Each said stage comprises a multiplicity of hydrocyclones operating in parallel. By using hydrocyclones in this way it is possible to obtain a dense suspension of clean starch, representing a high percentage of the total starch in the feed stream as the apex discharge fraction (the so-called "underflow" fraction) from the hydrocyclones.

It has been proposed, see e.g. U.S. Pat. No. 4,132,566 and United Kingdom patent application No. 2 032 245, to use hydrocyclones in the processing of a wheat flour slurry.

The use of hydrocyclones for separating wheat starch and gluten has the advantage as compared with other known methods, that it requires much less water per unit quantity of flour, and consequently less energy is required for evaporating contaminated water and keeping the sewage volume within acceptable limits. Moreover the high shearing forces generated within the hydrocyclones pre-condition the gluten in a way which promotes its separation so that a high yield of high gluten or, what is more important, of its insoluble protein constituent, is obtained, also from soft wheat flour. However the previously proposed processes for separately recovering wheat starch and gluten from a wheat flour slurry by using hydrocyclones suffer from the disadvantage that the yield of prime starch is lower than that which might reasonably be expected.

Much research has been undertaken into the causes of the lower effectiveness of hydrocyclones for handling wheat flour slurries, with a view to overcoming this problem. A possible contributory factor was recognised in the peculiar particle size distribution of the starch constituent of the wheat. Wheat starch particles are typically distributed over distinct particle size ranges, such as approximately 2 to 8 microns and approximately 12 to 40 microns. But experiments showed that the cause or the principal cause of the limited separating efficiency has to be found elsewhere.

The present invention is based on the discovery that fibre and pentosans, when present in the feed stream to a hydrocyclone, adversely affect the operation of the hydrocyclone. The adverse effect seems to be attributable to an influence which the fibre and pentosans, particularly the latter, have on the viscosity of the slurry when they are subjected to the shear forces which prevail in the liquid vortex. An increase in the viscosity of the liquid in a hydrocyclone reduces its efficiency by reducing the proportion of the feed stream energy which is translated into kinetic energy of rotation near the core of the vortex, which latter energy should be as high as possible for achieving maximum separating efficiency, particularly in respect of very samll particles.

The aforesaid adverse effect becomes more serious because at the present time it is necessary for wheat starch plants to reduce their water consumption in order to reduce or eliminate process water sewage disposal or evaporation costs. The less the amount of water passing through the system, the higher is the pentosan concentration.

The process according to the present invention involves the use of hydrocyclone apparatus split into two sections for performing different separating operations and the removal of pentosans or of fibre and pentosans between those operations.

A process according to the invention is defined in claim 1 hereof. The process is characterised in that the aqueous flour slurry is fed into a first section of a hydrocyclone apparatus which delivers a starch-rich underflow fraction, and an overflow fraction containing the gluten and some starch; agglomerated gluten is removed from said overflow fraction by screening; and the starch-containing throughput from this screening operation and the underflow fraction from said first section of the hydrocyclone apparatus are treated to reduce their pentosan content and are then fed into a second section of the hydrocyclone apparatus, which delivers a concentrated starch fraction as the underflow.

In this process, the hydrocyclones constituting the first section have merely to effect a rough separation to remove gluten from the flour slurry. For the purpose of this rough separation, the effect of pentosans in the slurry is relatively unimportant. The gluten becomes subjected in these hydrocyclones, which can conveniently be called "the gluten cyclones", to shearing forces which affect the gluten in ways which predispose it to agglomeration into larger quanta in the form of lumps or threads. In addition, the shear forces have the effect of releasing gluten-bound starch. The first hydrocyclone section may comprise for example from two to six hydrocyclone stages connected in series. It is an advantage to feed these hydrocyclones under a relatively high pressure in order to generate high shear forces for pre-conditioning the gluten. Prior to being fed into the gluten hydrocyclones the flour slurry can be subjected to shear forces by kneading or agitation or otherwise as known per se in the wheat starch industry in order to promote hydration and development of the gluten, thereby further facilitating its subsequent removal.

The agglomerated gluten can be removed from the overflow fraction from the gluten cyclones by means of screens (hereafter called "gluten screens"), and the throughput from these screens can then be added to the starchy underflow fraction from the gluten cyclones prior to treatment thereof to remove pentosans.

For achieving the best results, the pentosans should be removed as completely as possible from the slurry to be fed to the second section of the hydrocyclone apparatus. However, it is not necessary to effect substantially complete removal of the pentosans in order to achieve a significant improvement in the starch yield. The pentosans have a marked affinity for water and at least the greater part of the pentosan content of the slurry can be removed by removing the greater part of the water therefrom. The pentosan removal can therefore easily be achieved by centrifuging the slurry. The operation of a centrifuge is not dependent on the viscosity of the feedstock in the same way as a hydrocyclone. By means of a centrifuge pentosans can be quickly removed and discharged together with an amount of water and soluble impurities as the centrifuge overflow. The overflow can be recycled in the plant for use as process water, e.g. in the flour and water mixing and kneading station, any surplus being evaporated. The extent of water removal by the centrifuge can be such as to bring the starch slurry to an appropriate density for feeding into the second stage of the hydrocyclone apparatus.

As previously indicated, a further discovery during research leading up to the present invention is that the presence of fibre, particularly fibre of about 150 to 200 microns in size, in the feedstream to the hydrocyclone of the second section of the hydrocyclone apparatus (which can conveniently be called "the refining cyclones") can also adversely affect their separating efficiency, and although an improvement in the starch yield can be achieved without removing fibre or without removing any appreciable amount of fibre from the slurry feeding to those cyclones, it is desirable to include a fibre removal step in order to make the starch yield as high as possible. A large percentage of the fibre can be removed by screening at least part of the slurry which forms the underflow from the gluten cyclones. The same screen or set of screens can be employed for screening off both fibre and an amount of pentosans.

The second section of the hydrocyclone apparatus, which comprises the refining cyclones, may comprise, for example from six to twelve hydrocyclone stages. In this battery the starch is preferably washed in countercurrent with wash water in order to remove most of the residual soluble and non-soluble contaminants.

The splitting of the hydrocyclone apparatus and the removal of pentosans or pentosans and fibre from the slurry prior to treatment in the refining cyclones affords important advantages because of the higher separating efficiency of these cyclones.

The higher efficiency of the refining hydrocyclones means that an appreciably larger amount of prime (A-grade) wheat starch can be recovered for given fresh water and energy consumption values. Tests indicate that by using a process according to the invention and in which at least the greater part of the pentosans and of the fibre are removed between the treatments in the first and second hydrocyclone sections, wheat starch recovery, expressed as a percentage of the wheat flour weight, can be considerably higher than the best recovery hitherto achieved by means of hydrocyclones, with comparable process conditions and fresh water consumption. The higher starch recovery is particularly evident in the case of the wheat starch particles in the lower size range, below 10 microns.

Another important advantage is the fact that at the same time the process is capable of giving a high yield of insoluble protein, this being the valuable major constituent of the separated gluten fraction.

The process according to the invention is applicable for processing hard and soft wheat flour, including wholemeal flour. Its usefulness for processing soft wheat flour is particularly valuable because gluten separation from soft wheat flour normally involves more difficulty.

The invention includes a wheat starch processing plant constructed for carrying out a process according to the invention as hereinbefore defined.

An embodiment of the invention will now be described by way of example with reference to the accompanying flow sheet representing a wheat starch recovery plant.

In station 1, water and wheat flour are mixed and kneaded and/or stirred in ways known to those skilled in the art. The resulting slurry is pumped into the first section 2 of a hydrocyclone battery, which section effects separation of the slurry into a starch-rich fraction which discharges as underflow, and an overflow fraction which includes the gluten and some starch. This overflow fraction is screened in a screening station 3. In consequence of the repeated shearing actions on the slurry, especially in the hydrocyclones, the gluten becomes agglomerated and can be screened off on screens with openings of 0.3–2 mm width. The slurry passing through the screens is added to the underflow of the first hydrocyclone battery section 2 and screened in a screening station 4, in which part of the pentosans and the fibre are caught on screens with 50–150 micron openings, and washed free from starch. The filtrate from screening station 4 is then fed to a centrifugal separator 5 in which most of the remaining pentosans, which had marked affinity for water, are removed in the overflow, which is available for use as process water in different sections of the plant. Centrifuge 5, being a mechanical separator, is much less vulnerable than hydrocyclones to increases in viscosity and is well able to concentrate substantially all of the starch particles in its underflow. Screens 4 and centrifuge 5 are interposed between the first section 2 and the second section 6 of the hydrocyclones battery, which second section comprises a series of 6–12 multihydrocyclone stages in which the starch is washed with fresh water countercurrently, to remove residual solubles and insoluble contaminants and deliver a prime or so-called A-grade starch slurry.

The overflow from station 6 is fed to a concentrating and dewatering station 7 for B-grade starch. The overflow from this station 7 is also available for use as process water in different sections of the plant; excess process water is evaporated in evaporator 8. The concentrate of the evaporator comprises minerals, pentosans and some liquefied starch. The quanity of process water that has to be evaporated to avoid any discharge of water to the sewer is not more than one and a half times the weight of flour.

The described system can be varied in several ways without seriously affecting overall performance, as long as the hydrocyclone battery is split up into two sections and a pentosan reducing facility is interposed between the two sections.

The water temperature is preferably held in the range 30° to 45° C. in the whole process.

EXAMPLE

Using the described system according to the invention, for recovering starch and gluten from soft wheat flour the following yields were obtained for a fresh water consumption of 2.2 m³/ton of flour:

|  | Yield |
|---|---|
| Insoluble protein (based on the insoluble protein content of the flour) | 94% |
| A-grade starch (based on dry solids) | 59% |
| B-grade starch (based on dry solids) | 17% |

By comparison, when performing the process without removing pentosans or fibre it was found that even when increasing the fresh water consumption to 4 m³/ton of the flour, the insoluble protein yield was only 88% and the yield of A-grade starch was only 54%; whereas the yield of B-grade starch was 19%. This high water consumption could be considerably reduced by removing only pentosans but the separating efficiency would not be so high as in the above Example.

What we claim is:

1. A process for separating wheat starch and gluten, present in a pentosan-containing aqueous wheat flour slurry, which process comprises the steps of feeding said aqueous flour slurry into a first section of a hydrocyclone apparatus which delivers a starch-rich underflow fraction, and an overflow fraction containing gluten and some starch; removing agglomerated gluten from said overflow fraction by screening; centrifuging the starch-containing throughput from this screening operation and the underflow fraction from said first section of the hydrocyclone apparatus thereby to separate off a pentosan-containing water fraction as centrifuge overflow; and feeding the centrifuge underflow into a second section of the hydrocyclone apparatus in which second section starch is washed in counter-current with water and from which a concentrated washed starch fraction is delivered as underflow, whereby the separation of the pentosan-containing water fraction improves the yield of starch from the second section of the hydrocyclone apparatus.

2. A process according to claim 1, wherein at least the underflow fraction from the first hydrocyclone section is screened to remove fiber.

3. A process for separating wheat starch and gluten present in a pentosan-containing aqueous wheat flour slurry, which process comprises the steps of feeding said aqueous flour slurry into a first section of a hydrocyclone apparatus which delivers a starch-rich underflow fraction, and an overflow fraction containing gluten and some starch; removing agglomerated gluten from said overflow fraction by a screening operation; subjecting the starch-containing throughput from that screening operation and the underflow fraction from said first section of the hydrocyclone apparatus first to a screening treatment to reduce their fiber content and then to centrifuging, thereby to separate off a pentosan-containing water fraction as centrifuge overflow; and feeding the centrifuge underflow into a second section of the hydrocyclone apparatus in which second section the starch is washed in counter-current with water and from which a concentrated washed starch fraction is delivered as underflow, whereby the separation of the pentosan-containing water fraction improves the yield of starch from the second section of the hydrocyclone apparatus.

* * * * *